(12) United States Patent
Im

(10) Patent No.: US 7,936,204 B2
(45) Date of Patent: May 3, 2011

(54) TEMPERATURE SENSING CIRCUIT

(75) Inventor: Jong-Man Im, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 12/488,133

(22) Filed: Jun. 19, 2009

(65) Prior Publication Data

US 2010/0164602 A1 Jul. 1, 2010

(30) Foreign Application Priority Data

Dec. 26, 2008 (KR) .................. 10-2008-0134582

(51) Int. Cl.
G01K 7/01 (2006.01)
H03M 1/12 (2006.01)
G05F 3/08 (2006.01)

(52) U.S. Cl. ........ 327/512; 327/538; 323/314; 323/907; 374/170

(58) Field of Classification Search .................. None
See application file for complete search history.

(56) References Cited

U.S. PATENT DOCUMENTS

| | | | | |
|---|---|---|---|---|
| 6,876,250 B2* | 4/2005 | Hsu et al. | .................. | 327/539 |
| 7,127,368 B2* | 10/2006 | Choi | .................. | 702/130 |
| 7,276,891 B2* | 10/2007 | Watanabe et al. | .................. | 323/316 |
| 7,315,792 B2* | 1/2008 | Min et al. | .................. | 702/130 |
| 7,451,053 B2 | 11/2008 | Jeong | | |
| 7,508,332 B2 | 3/2009 | Jeong et al. | | |
| 7,579,899 B2* | 8/2009 | Senriuchi et al. | .................. | 327/512 |
| 2006/0232326 A1* | 10/2006 | Seitz et al. | .................. | 327/539 |
| 2008/0061865 A1* | 3/2008 | Koerner | .................. | 327/512 |
| 2008/0158036 A1 | 7/2008 | Jeong | | |
| 2009/0072882 A1 | 3/2009 | Jeong | | |
| 2009/0323764 A1* | 12/2009 | Im | .................. | 374/183 |

FOREIGN PATENT DOCUMENTS

| | | |
|---|---|---|
| JP | 2008-083021 | 4/2008 |
| JP | 2008-164615 | 7/2008 |
| JP | 2008-165962 | 7/2008 |
| KR | 1020050067520 | 7/2005 |

OTHER PUBLICATIONS

Notice of Preliminary Rejection issued from Korean Intellectual Property Office on Jun. 28, 2010.

* cited by examiner

*Primary Examiner* — Lincoln Donovan
*Assistant Examiner* — Terry L Englund
(74) *Attorney, Agent, or Firm* — IP & T Group LLP

(57) ABSTRACT

A temperature sensing circuit includes a temperature-dependent voltage generating block configured to generate a plurality temperature-dependent voltages having voltage levels that are changed according to temperature; and a comparing block configured to compare each voltage level of the temperature-dependent voltages with a voltage level of a predetermined voltage to output thermal codes.

17 Claims, 5 Drawing Sheets

TEMPERATURE SENSING CIRCUIT

CROSS-REFERENCE TO RELATED APPLICATIONS

The present invention claims priority of Korean patent application number 10-2008-0134582, filed on Dec. 26, 2008, the disclosure of which is incorporated by reference herein in its entirety.

BACKGROUND OF THE INVENTION

The present invention relates to a temperature sensing circuit, and more particularly, to a technology for reducing the size of a temperature sensing circuit and detecting temperature with a high accuracy.

A temperature sensing circuit in a semiconductor memory device refers to a circuit applied on a semiconductor chip to measure temperature. Especially, the temperature sensing circuit is generally used in a conventional Dynamic Random Access Memory (DRAM), and it will be explained how the temperature sensing circuit is applied to the DRAM.

A cell of the DRAM includes a transistor acting as a switch and a capacitor for storing electric charges (data). Data of the cell is distinguishable between "high" (logic 1) or "low" (logic 0) according to whether electric charges exist in a capacitor of a memory cell, that is, whether a terminal voltage of a capacitor is high or low.

Since data is stored in form of electric charges accumulated in a capacitor, there should be no power consumption ideally. However, leakage current caused through P-N junction of a transistor may exist and discharge initially stored electric charges. That is, the stored data may be lost. To prevent this problem, data in a memory cell is read before being lost and the normal level of electric charges is restored according to the read information.

This operation is repeated periodically to retain data and this cell recharging process is called a refresh operation. Typically, the refresh operation is controlled by a DRAM controller. In performing the refresh operation and the control thereof, additional power is consumed in the DRAM.

A concern in a battery-operated system with lower power is the reduction of power consumption. An example of an attempt to reduce the power consumption necessary for the refresh operation is to change a refresh period according to temperature. More specifically, data retention time in the DRAM becomes longer as temperature becomes lower. Accordingly, when a temperature range is divided into a plurality of regions and a frequency of a refresh clock is decreased to be relatively low in a low temperature region (the refresh period is increased), it is apparent that power consumption will be decreased. Therefore, a temperature sensing circuit which can accurately detect temperature in the DRAM and output information about the detected temperature may be useful.

Moreover, as the integration level and operating speed of the DRAM are increased, a large amount of heat is generated in the DRAM itself. The increased temperature of the DRAM due to the generated heat may cause the interruption of the normal operation and the failure of the DRAM itself. Accordingly, there is a growing need for a temperature sensing circuit which can accurately detect the temperature of the DRAM and output information about the detected temperature.

FIG. 1 is a block diagram illustrating the structure of a typical temperature sensing circuit.

The temperature sensing circuit includes a temperature-dependent voltage generator 110 for outputting a temperature-dependent voltage VTEMP varying with temperature, and an analog-to-digital converter 120 for converting the temperature-dependent voltage VTEMP into a digital thermal code THERMAL_CODE.

Specifically, the temperature-dependent voltage generator 110 detects temperature based on the fact that a change of a base-emitter voltage (VBE) of a bipolar junction transistor (BJT) is about −1.8 mV/° C. in a bandgap circuit generating a bandgap voltage that is not affected by temperature and supply voltage. Moreover, the temperature-dependent voltage generator 110 amplifies the slightly-changing base-emitter voltage (VBE) of the BJT to output the temperature-dependent voltage VTEMP that is in 1:1 correspondence to the temperature. That is, the temperature-dependent voltage generator 110 generates the temperature-dependent voltage VTEMP that decreases as temperature increases.

The analog-to-digital converter 120 converts the temperature-dependent voltage VTEMP outputted from the temperature-dependent voltage generator 110 into the digital thermal code THERMAL_CODE. The analog-to-digital converter 120 is typically implemented with a tracking analog-to-digital converter.

FIG. 2 is a circuit diagram illustrating the structure of the temperature-dependent voltage generator 110 of FIG. 1.

The temperature-dependent voltage generator 110 is a kind of a bandgap circuit. In FIG. 2, both of a unit for generating a temperature-dependent voltage VTEMP and a unit for generating a reference voltage VREF are shown. Although only the unit for generating the temperature-dependent voltage VTEMP is related to the temperature sensing circuit, the typical bandgap circuit is designed to generate both the temperature-dependent voltage VTEMP and the reference voltage VREF.

First, the generation of the temperature-dependent voltage VTEMP will be described.

A voltage VBE2 of a BJT Q2 is inputted into an operational amplifier 101, and voltages of two input terminals (+, −) of the operational amplifier 101 become equal due to a virtual short principle. That is, VTEMP=(1+R10/R9)*VBE2. Since the base-emitter voltage VBE2 of the BJT Q2 is changed according to temperature, the temperature-dependent voltage VTEMP that is the amplified base-emitted voltage VBE2 is also changed according to temperature.

The generation of the reference voltage VREF will be described.

Emitter currents of two BJTs Q1 and Q2 having a ratio of N:1 are expressed as the following equation.

$$I_{Q1}=I_S*\exp[VBE1/V_T], I_{Q2}=N*I_S*\exp[VBE2/V_T]$$

where $V_T$ is a temperature coefficient and $I_S$ is a saturation current.

When electric potentials of VBE1 and X node are equal by the operational amplifier 102, a current IPTAT flowing through a resistor R1 is expressed as the following equation.

$$IPTAT=(VBE1-VBE2)/R1=\ln(N*A)*V_T/R1$$

Moreover, under the same condition, a current ICTAT flowing through resistance R2 is expressed as the following equation.

$$ICTAT=VBE1/R2$$

That is, the current IPTAT increases in proportion to temperature, and the current ICTAT increases in inverse proportion to temperature.

Under the assumption that the same amount of current flows through the MOS transistors having the same size, currents M*IPTAT and K*ICTAT become M*IPTAT and K*ICTAT as indicated.

The reference voltage VREF outputted based on the above fact is expressed as the following equation.

$$VREF = K*R3/R2*(VBE1+(M*R3)/(K*R1)*\ln(N*A)*V_T)$$

When values of M, R1, R2, R3, K and M are appropriately adjusted in order to compensate for temperature, the reference voltage VREF has a constant value at all times regardless of temperature change. Generally, while the values of N, R1, R2 and R3 are fixed, only the values of K and M are adjusted in order to allow the reference voltage VREF to have a constant value at all times regardless of temperature.

Since the generated reference voltage VREF is constant even when temperate is changed, it is used as a reference voltage in various internal circuits of a chip.

As mentioned above, the temperature-dependent voltage VTEMP is expressed as VTEMP=(1+R10/R9)*VBE2. Since the value of VBE2 is changed according to temperature, the temperature-dependent voltage is also changed according to temperature.

However, the value of VBE2 is not changed only by the change of temperature. The value of VBE2 is also affected by process variations. When the value of VBE2 is changed by the process variations of the BJT, the temperature-dependent voltage is also changed.

Therefore, when the temperature sensing circuit outputting the thermal code by using the temperature-dependent voltage VTEMP is affected by the process variations, errors may occur in the measured temperature whenever processes are changed.

FIG. 3 is a block diagram illustrating the structure of the analog-to-digital converter 120 of FIG. 1.

The analog-to-digital converter 120 includes a voltage comparing unit 310, a counting unit 320, and a converting unit 330. The analog-to-digital converter 120 converts the temperature-dependent voltage VTEMP outputted from the temperature-dependent voltage generator 110 of FIG. 1 into the digital thermal code THERMAL_CODE.

In operating the analog-to-digital converter 120, the converting unit 330 is a digital-to-analog converter which outputs an analog voltage DACOUT in response to the digital thermal code THERMAL_CODE outputted from the counting unit 320. The voltage comparing unit 310 compares the temperature-dependent voltage VTEMP with the analog voltage DACOUT. When the temperature-dependent voltage VTEMP is lower than the analog voltage DACOUT, the voltage comparing unit 310 outputs a decrement signal DEC for decreasing the value of the digital thermal code THERMAL_CODE by the counting unit 320. On the other hand, when the temperature-dependent voltage VTEMP is higher than the analog voltage DACOUT, the voltage comparing unit 310 outputs an increment signal INC for increasing the value of the digital thermal code THERMAL_CODE by the counting unit 320. The counting unit 320 receives the increment signal INC or the decrement signal DEC from the voltage comparing unit 310, and increases or decreases the digital thermal code THERMAL_CODE stored therein.

In summary, the analog-to-digital converter 120 repeatedly performs the operation of comparing the temperature-dependent voltage VTEMP with the analog voltage DACOUT to increase or decrease the digital thermal code THERMAL_CODE. Thus, the analog voltage DACOUT tracks the temperature-dependent voltage VTEMP, and the digital thermal code THERMAL_CODE obtained when the tracking is completed becomes a digital value that is converted from the temperature-dependent voltage VTEMP.

However, since the tracking analog-to-digital converter includes the complicated logic circuits such as the voltage comparing unit 310, the counting unit 320, and the converting unit 330, it occupies a relatively large circuit area.

SUMMARY OF THE INVENTION

Exemplary embodiments of the present invention are directed to increase the accuracy of a temperature sensing circuit by generate a temperature-dependent voltage having a constant level according to temperature even when process variations occur.

Additionally, exemplary embodiments of the present invention are directed to reduce a total size of a temperature sensing circuit by implementing a circuit for converting an analog temperature-dependent voltage into a digital thermal code.

In accordance with an aspect of the present invention, there is provided a temperature sensing circuit including: a temperature-dependent voltage generating block configured to generate a plurality temperature-dependent voltages having voltage levels that are changed according to temperature; and a comparing block configured to compare each voltage level of the temperature-dependent voltages with a voltage level of a predetermined voltage to output thermal codes.

In accordance with another aspect of the present invention, there is provided a temperature sensing circuit including: a current generating block configured to generate a temperature-dependent current having a current amount that is changed according to temperature; a voltage generating block configured to mirror the temperature-dependent current and generate a temperature-dependent voltage through the mirrored current; and a comparing block configured to compare a level of the temperature-dependent voltage with a level of a predetermined voltage to generate a thermal code.

The current generator may include a first transistor and a second transistor, and the temperature-dependent current reflects a difference between a base-emitter voltage of the first transistor and a base-emitter voltage of the second transistor.

In accordance with another aspect of the present invention, there is provided a method for sensing temperature, the method including generating a plurality of temperature-dependent voltages having voltage levels that are changed according to temperature, comparing each voltage level of the temperature-dependent voltages with a voltage level of a predetermined voltage to output thermal codes, and generating a thermal code having bits that are determined based on the comparisons.

DESCRIPTION OF SPECIFIC EMBODIMENTS

Other objects and advantages of the present invention can be understood by the following description, and become apparent with reference to the embodiments of the present invention.

Figure 4:
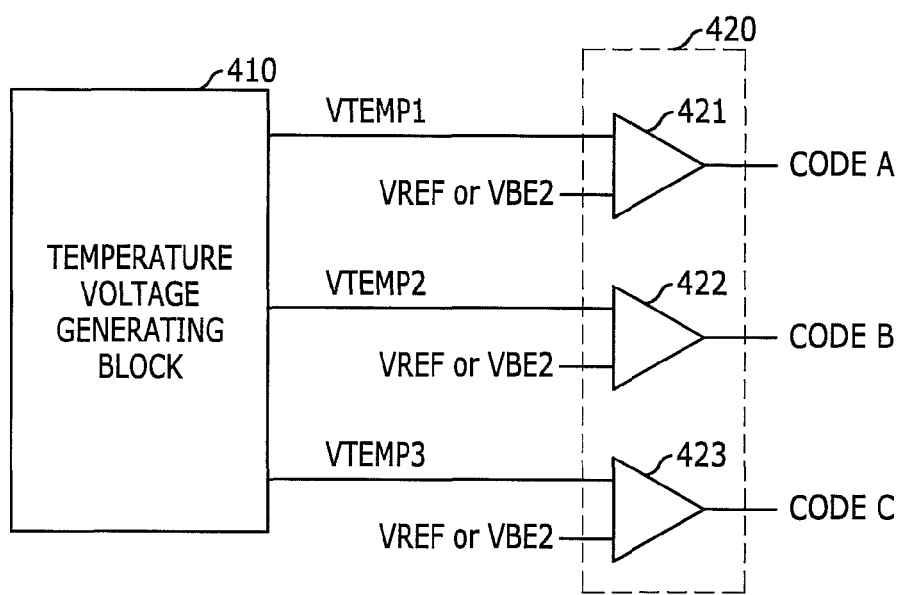
FIG. 4 is a block diagram illustrating the structure of a temperature sensing circuit in accordance with an embodiment of the present invention.

FIG. 4 illustrates the structure of a temperature sensing circuit in accordance with an embodiment of the present invention.

Referring to FIG. 4, the temperature sensing circuit in accordance with the embodiment of the present invention includes a temperature-dependent voltage generating block 410 and a comparing block 420.

The temperature-dependent voltage generating block 410 generates a plurality of temperature-dependent voltages VTEMP1, VTEMP2 and VTEMP3. The temperature-dependent voltages VTEMP1, VTEMP2 and VTEMP3 have levels varying with temperature, and have different levels from each other. That is, the temperature-dependent voltages VTEMP1, VTEMP2 and VTEMP3 each have temperature dependency, but have respectively different levels at the same temperature. For example, the temperature-dependent voltages VTEMP1, VTEMP2 and VTEMP3 each increase in proportion to temperature, but may have a relation where VTEMP1>VTEMP2>VTEMP3 at the same temperature.

The comparing block 420 compares the levels of the temperature-dependent voltages VTEMP1, VTEMP2 and VTEMP3 with the level of a predetermined voltage to output thermal codes CODE A, CODE B and CODE C. The predetermined voltage may be a reference voltage VREF maintaining a constant level or a voltage VBE2 increasing in inverse proportion to temperature. As illustrated in FIG. 4, the comparing block 420 may include a plurality of comparison units 421, 422 and 423 receiving one of the temperature-dependent voltages VTEMP1, VTEMP2 and VTEMP3 and the predetermined voltage VREF or VBE2.

Although FIG. 4 shows that the temperature-dependent voltage generating block 410 generates the plurality of temperature-dependent voltages VTEMP1, VTEMP2 and VTEMP3 and the comparing block 420 includes the plurality of comparison units 421, 422 and 423, it may be configured so that the temperature-dependent voltage generating block 410 generates only one temperature-dependent voltage VTEMP1 and the comparing block 420 includes only one comparison unit 421 for comparing the temperature-dependent voltage VTEMP1 with the predetermined voltage VREF or VBE2.

Figure 5:
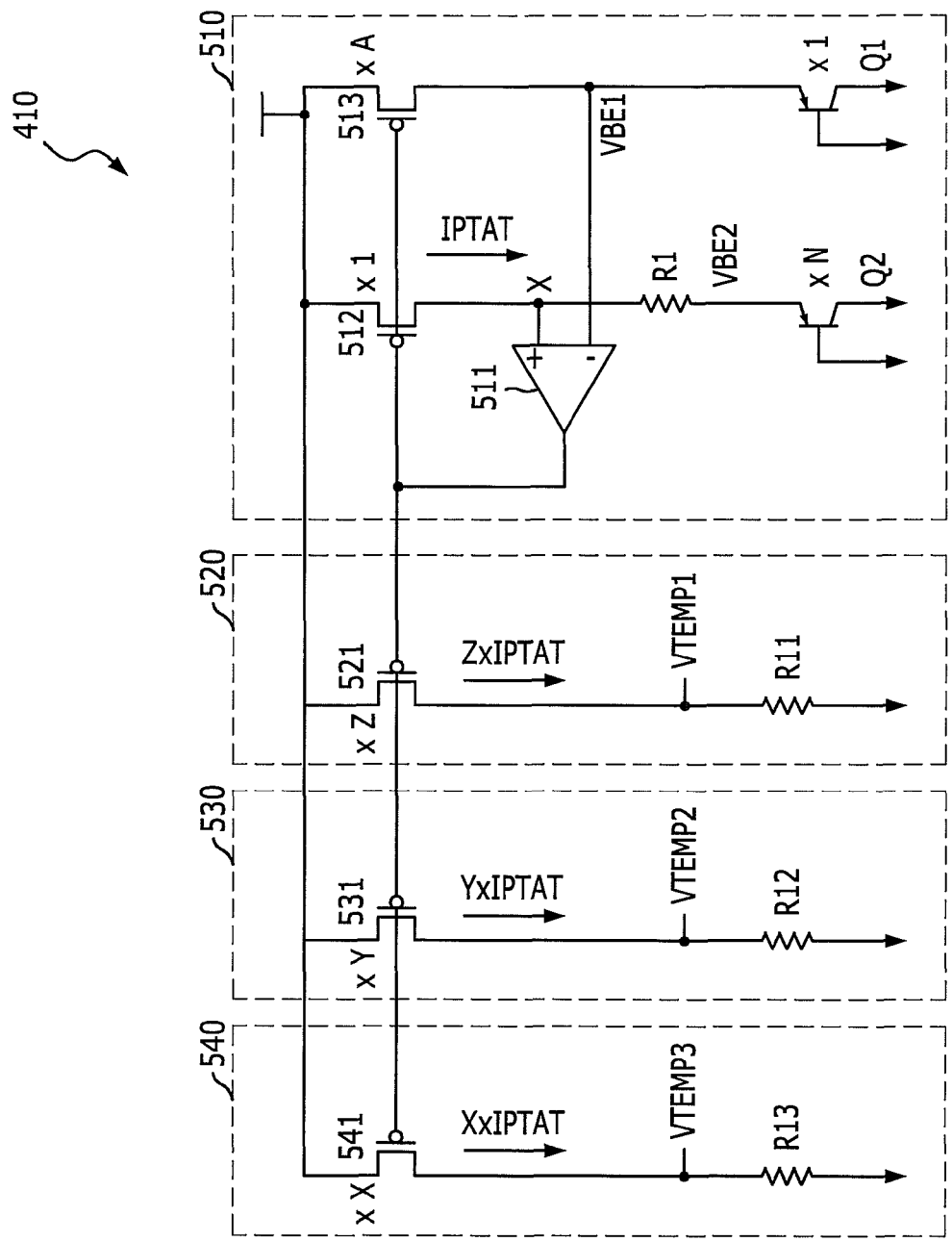
FIG. 5 is a circuit diagram illustrating the structure of a temperature-dependent voltage generator of FIG. 4 in accordance with an embodiment of the present invention.

FIG. 5 is a circuit diagram illustrating the structure of the temperature-dependent voltage generating block 410 of FIG. 4 in accordance with an embodiment of the present invention.

The temperature-dependent voltage generating block 410 includes a current generating unit 510 and a plurality of voltage generating units 520, 530 and 540. The current generating unit 510 generates temperature-dependent current IPTAT having a current amount changed according to temperature. The plurality of voltage generating units 520, 530 and 540 mirror the temperature-dependent current IPTAT and generate temperature-dependent voltages VTEMP1, VTEMP2 and VTEMP3 by using the mirrored currents X*IPTAT, Y*IPTAT and Z*IPTAT. The plurality of voltage generating units 520, 530 and 540 generate the temperature-dependent voltage VTEMP1, VTEMP2 and VTEMP3 having different voltage levels due to different mirroring ratios.

The current generating unit 510 generates the temperature-dependent current IPTAT which corresponds to a current reflecting the voltage difference between a base-emitter voltage VBE1 of a first transistor Q1 and a base-emitter voltage VBE2 of a second transistor Q2.

The current generating unit 510 includes the first transistor Q1, the second transistor Q2, a resistor R1, an operational amplifier 511, a third transistor 512, and a fourth transistor 513. The first transistor Q1 has a base and a collector grounded together, and an emitter connected to a second node VBE1. The second transistor Q2 has a base and a collector grounded together, and an emitter connected to a third node VBE2. The resistor R1 is connected between the third node VBE2 and a first node X. The operational amplifier 511 has input terminals connected to the first node X and the second node VBE1. The third transistor 512 supplies a current to the first node X in response to an output of the operational amplifier 511. The fourth transistor 513 supplies a current to the second node VBE1 in response to the output of the operational amplifier 511.

The voltage generating units 520, 530 and 540 generate temperature-dependent voltages VTEMP1, VTEMP2 and VTEMP3 which correspond to voltage drops produced when the mirrored currents Z*IPTAT, Y*IPTAT and X*IPTAT flow through the resistors R11, R12 and R13. The voltage generating units 520, 530, and 540 respectively include fifth transistors 521, 531, and 541, and resistors R11, R12, and R13. The fifth transistors 521, 531, and 541 respectively supply a current to the resistors R11, R12, and R13 in response to an output of the operational amplifier 511. The resistors R11, R12, and R13 are connected respectively between the fifth transistors 521, 531, and 541 and the ground terminal to supply temperature-dependent voltages VTEMP1, VTEMP2, and VTEMP3. When the temperature-dependent voltage generating block 410 is configured to generate only one temperature-dependent voltage, for example, VTEMP1, only one voltage generating unit 520 is provided.

Using equations, the generation of the temperature-dependent voltages VTEMP1, VTEMP2 and VTEMP3 from the temperature-dependent voltage generating block 410 will be described.

The emitter currents of two BJTs Q1 and Q2 having a ratio of N:1 is expressed by the following equation.

$$I_{Q1}=I_S^*\exp[VBE1/V_T], I_{Q2}=N^*I_S^*\exp[VBE2/V_T] \quad (1)$$

The relationship of $I_{Q1}$ and $I_{Q2}$ is expressed by the following equation.

$$I_{Q1}=A^*I_{Q2} \quad (2)$$

When electric potentials of VBE1 and the node X are driven to be the same by the operational amplifier 511, the current IPTAT flowing through the resistor R1 is expressed by the following equation.

$$IPTAT=(VBE1-VBE2)/R1 \quad (3)$$

Using the equations (1) and (2), the equation (3) can be rewritten as the following equation.

$$IPTAT=\ln(N^*A)^*V_T/R1 \quad (4)$$

Accordingly, the currents mirrored by the respective voltage generating units are expressed by the following equations.

$$Z^*IPTAT=Z^*\ln(N^*A)^*V_T/R1$$

$$Y^*IPTAT=Y^*\ln(N^*A)^*V_T/R1$$

$$X^*IPTAT=X^*\ln(N^*A)^*V_T/R1$$

The generated temperature-dependent voltages are expressed by the following equations.

$$VTEMP1=(Z*(R11/R1)*V_T)*\ln(N*A)$$

$$VTEMP2=(Y*(R12/R1)*V_T)*\ln(N*A)$$

$$VTEMP3=(X*(R13/R1)*V_T)*\ln(N*A)$$

Figure 1:
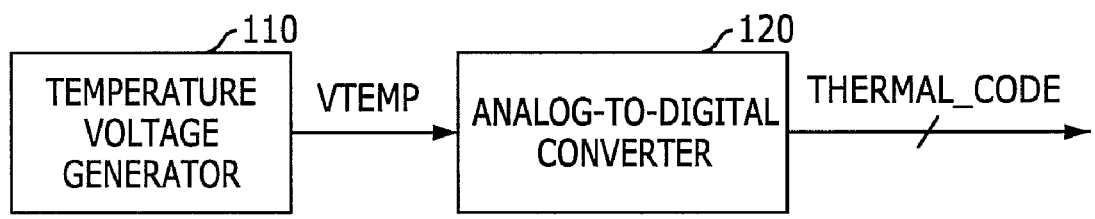
FIG. 1 is a block diagram illustrating the structure of a conventional temperature sensing circuit.
Figure 2:
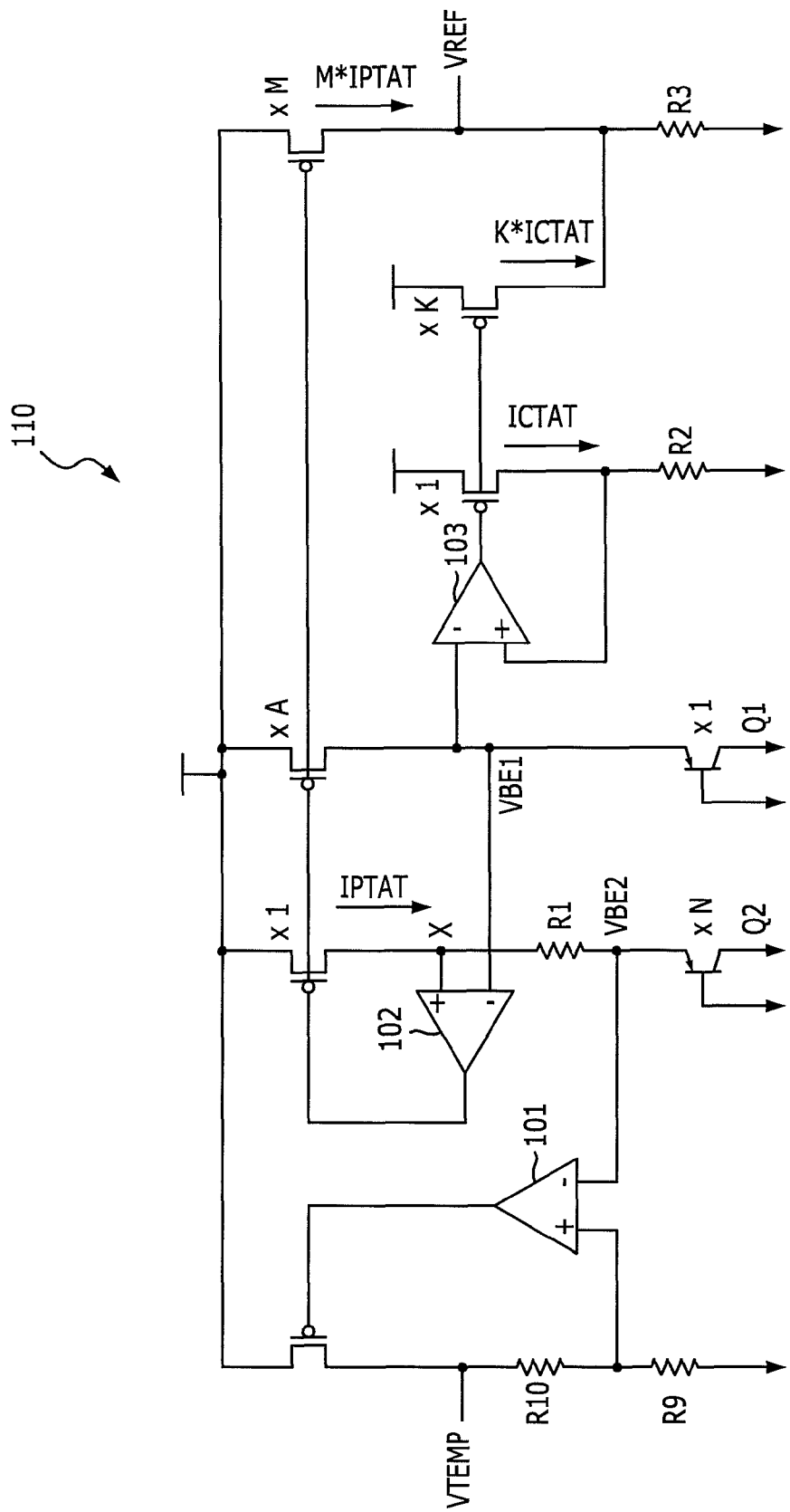
FIG. 2 is a circuit diagram illustrating the structure of a conventional temperature-dependent voltage generator.
Figure 3:
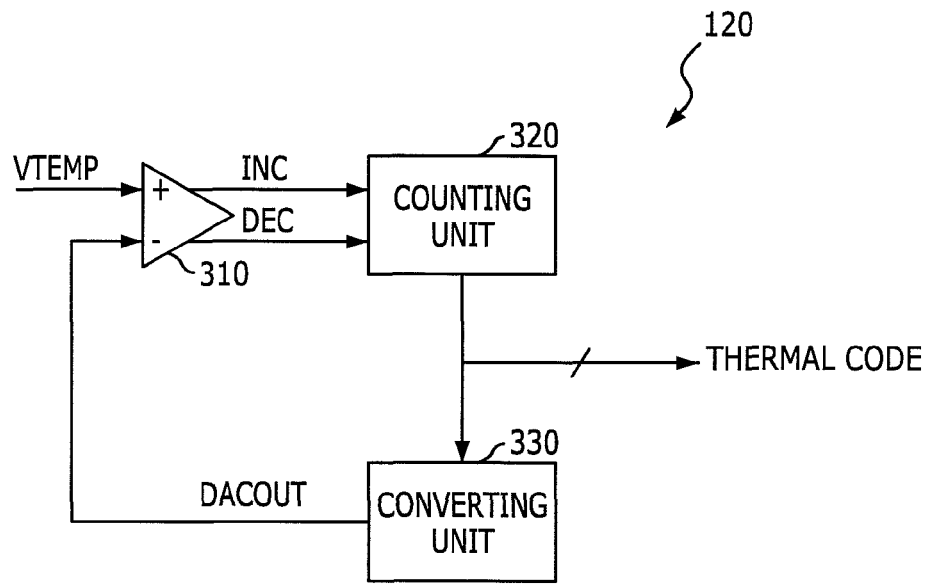
FIG. 3 is a block diagram illustrating the structure of a conventional analog-to-digital converter.

The typical temperature-dependent voltage VTEMP is expressed as (1+R10/R9)*VBE2 (as explained with respect to FIG. 2). In the above equation, since VBE2 is more or less significantly affected by process variations as well as temperature, the accuracy in typical temperature-dependent voltages may suffer.

However, the temperature-dependent voltages of the present invention are as follows.

$$VTEMP1=(Z*(R11/R1)*V_T)*\ln(N*A)$$

$$VTEMP2=(Y*(R12/R1)*V_T)*\ln(N*A)$$

$$VTEMP3=(X*(R13/R1)*V_T)*\ln(N*A).$$

Since the VBE2 term is not present in the above-equations related to the temperature-dependent voltage VTEMP, influence by process variations may be eliminated. Therefore, when the temperature-dependent voltages VTEMP1, VTEMP2 and VTEMP3 of the present invention are used, an accurate temperature may be measured constantly even if there are process variations.

Although a unit for generating the reference voltage VREF is generally included in the bandgap circuit such as the temperature-dependent voltage generating block 410, it has been already described in the background of the invention with reference to FIG. 2 and thus its illustration and description will be omitted for conciseness.

Figure 6A:
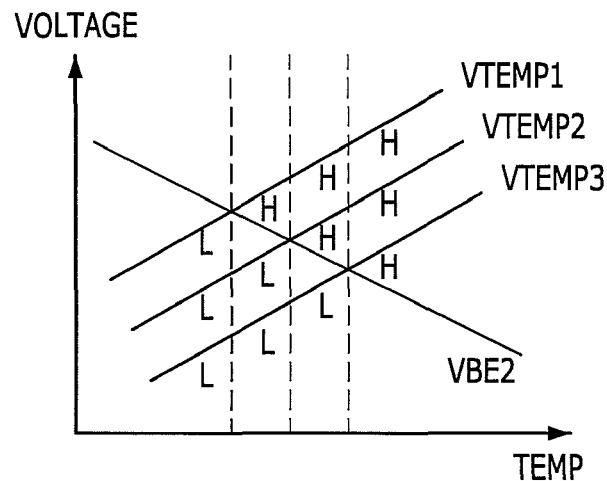
FIGS. 6A and 6B are graphs illustrating temperature-dependent voltages (VTEMP1, VTEMP2, VTEMP3) and a predetermined voltage (VREF or VBE2), and logic levels of thermal codes (CODEA, CODEB, CODEC) outputted according to their comparison results.
Figure 6B:
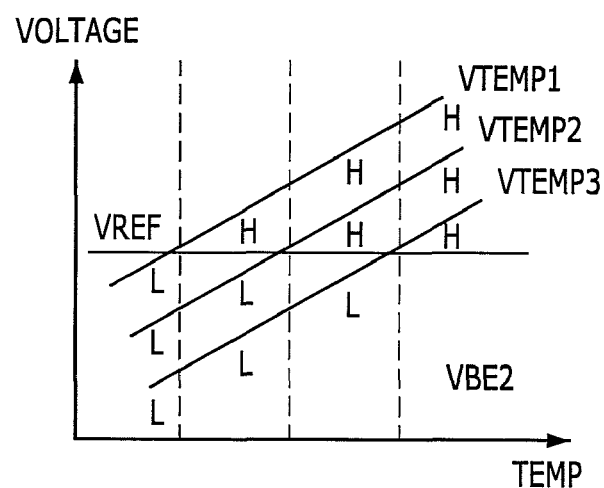

FIGS. 6A and 6B are graphs illustrating temperature-dependent voltages VTEMP1, VTEMP2 and VTEMP3 and a predetermined voltage VREF or VBE2, and logic levels of thermal codes CODE A, CODE B and CODE C outputted according to their comparison results.

FIG. 6A illustrates a case where the voltage VBE2 is used as the predetermined voltage. As can be seen from FIG. 6A, the predetermined voltage VBE2 increases in inverse proportion to temperature, and the temperature-dependent voltages VTEMP1, VTEMP2 and VTEMP3 increase in proportion to the temperature, while having different levels. As the temperature increases, the thermal codes CODE A, CODE B and CODE C are changed according to the comparison results. At the lowest temperature, the thermal codes CODE A, CODE B and CODE C have values of (L,L,L). As the temperature gradually increases, the thermal codes CODE A, CODE B and CODE C are sequentially changed to (H,L,L), (H,H,L) and (H,H,H). Accordingly, the current temperature can be confirmed by using the thermal codes CODE A, CODE B and CODE C.

FIG. 6B illustrates a case where the reference voltage VREF is used as the predetermined voltage. It can be seen from FIG. 6B that the predetermined voltage VREF maintains a constant level at all times. According to comparison results of the predetermined voltage VREF and the temperature-dependent voltages VTEMP1, VTEMP2 and VTEMP3, the thermal codes CODE A, CODE B and CODE C are sequentially changed to (L,L,L), (H,L,L), (H,H,L) and (H,H,H) as temperature increases.

In accordance with the embodiments of the present invention, the plurality of temperature-dependent voltages varying according to the temperature are generated, and the thermal codes indicating the thermal information are generated by comparing the temperature-dependent voltages with the predetermined voltage. Therefore, the size of the circuit for converting the temperature-dependent voltage into the thermal code can be significantly reduced.

Additionally, the temperature-dependent current is generated by using the difference of base-emitter voltages of two transistors, and the temperature-dependent voltage is generated by mirroring the temperature-dependent current. Therefore, the temperature can be more or less accurately measured by using the temperature-dependent voltages, regardless of the process variations.

While the present invention has been described with respect to the specific embodiments, it will be apparent to those skilled in the art that various changes and modifications may be made without departing from the spirit and scope of the invention as defined in the following claims.

What is claimed is:

1. A temperature sensing circuit, comprising:
   a temperature-dependent voltage generating block configured to generate a plurality temperature-dependent voltages having voltage levels that are changed according to temperature; and
   a comparing block configured to compare each voltage level of the temperature-dependent voltages with a voltage level of a predetermined voltage to output thermal codes,
   wherein the temperature-dependent voltages increase in proportion to temperature and have different levels at a same temperature and the predetermined voltage increases in inverse proportion to temperature.

2. The temperature sensing circuit of claim 1, wherein the temperature-dependent voltage generating block includes:
   a current generating unit configured to generate a temperature-dependent current having a current amount that changes according to temperature; and
   a plurality of voltage generating units configured to mirror the temperature-dependent current and generate the temperature-dependent voltages by using the mirrored temperature-dependent current, the voltage generating units having different current-mirroring ratios.

3. The temperature sensing circuit of claim 2, wherein the current generating unit includes a first transistor and a second transistor, and the temperature-dependent current reflects a difference between a base-emitter voltage of the first transistor and a base-emitter voltage of the second transistor.

4. The temperature sensing circuit of claim 2, wherein the current generating unit includes:
   a first transistor having a base and a collector grounded together;
   a resistor connected between an emitter of the first transistor and a first node;
   a second transistor having a base and a collector grounded together, and an emitter connected to a second node;
   an operational amplifier having input terminals connected to the first node and the second node;
   a third transistor configured to supply a current to the first node in response to an output of the operational amplifier; and
   a fourth transistor configured to supply a current to the second node in response to the output of the operational amplifier.

5. The temperature sensing circuit of claim 4, wherein each of the voltage generating units includes:
   a fifth transistor configured to supply a current in response to the output of the operational amplifier; and a resistor connected between the fifth transistor and a ground terminal to supply one of the temperature-dependent voltages corresponding to the current, wherein the size of the fifth transistor is different in each of the voltage generating units.

6. The temperature sensing circuit of claim 2, wherein each of the voltage generating units is configured to supply one of the temperature-dependent voltages corresponding to a voltage drop caused by the mirrored current.

7. The temperature sensing circuit of claim 3, wherein the first transistor and the second transistor have different sizes.

8. The temperature sensing circuit of claim 1, wherein the comparing block includes a plurality of comparing units configured to each receive the predetermined voltage and a respective one of the temperature-dependent voltages.

9. A temperature sensing circuit, comprising:
   a current generating block configured to generate a temperature-dependent current having a current amount that is changed according to temperature;
   a voltage generating block configured to mirror the temperature-dependent current and generate a temperature-dependent voltage through the mirrored current; and
   a comparator configured to compare a level of the temperature-dependent voltage with a level of a predetermined voltage to generate a thermal code,
   wherein the temperature-dependent voltage increases in proportion to temperature and the predetermined voltage increases in inverse proportion to temperature.

10. The temperature sensing circuit of claim 9, wherein the current generating block includes a first transistor and a second transistor, and the temperature-dependent current reflects a difference between a base-emitter voltage of the first transistor and a base-emitter voltage of the second transistor.

11. The temperature sensing circuit of claim 9, wherein the current generating block includes:
    a first transistor having a base and a collector grounded together;
    a resistor connected between an emitter of the first transistor and a first node;
    a second transistor having a base and a collector grounded together, and an emitter connected to a second node;
    an operational amplifier having input terminals connected to the first node and the second node;
    a third transistor configured to supply a current to the first node in response to an output of the operational amplifier; and
    a fourth transistor configured to supply a current to the second node in response to the output of the operational amplifier.

12. The temperature sensing circuit of claim 11, wherein the voltage generating block includes:
    a fifth transistor configured to supply a current in response to the output of the operational amplifier; and
    a resistor connected between the fifth transistor and a ground terminal to supply the temperature-dependent voltage corresponding to the current.

13. The temperature sensing circuit of claim 9, wherein the voltage generating block is configured to supply the temperature-dependent voltage corresponding to a voltage drop caused by the mirrored current.

14. The temperature sensing circuit of claim 10, wherein the first transistor and the second transistor have different sizes.

15. A method for sensing temperature, the method comprising:
    generating a plurality of temperature-dependent voltages having voltage levels that are changed according to temperature;
    comparing each voltage level of the temperature-dependent voltages with a voltage level of a predetermined voltage to output thermal codes; and
    generating a final thermal code having bits that are determined based on the thermal codes output by the comparisons,
    wherein the temperature dependent voltages increase in proportion to temperature and have different levels at a same temperature and the predetermined voltage increases in inverse proportion to temperature.

16. The method of claim 15, wherein different ones of the thermal code bits correspond to different ones of the comparisons, respectively.

17. The method of claim 15, wherein the thermal code with a logic high value for each of the bits correspond to a highest temperature region indicated by the final thermal code.

* * * * *